Aug. 9, 1932.                H. WEICHSEL                1,870,302
                        ALTERNATING CURRENT MOTOR
                          Filed Nov. 7, 1930

Inventor
HANS WEICHSEL
By E. E. Huffman
Att'y.

Patented Aug. 9, 1932

1,870,302

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

ALTERNATING CURRENT MOTOR

Application filed November 7, 1930. Serial No. 493,923.

My invention relates to single phase repulsion and repulsion induction motors, its primary object being to improve the commutation and hence the life of the brushes. Machines of this type are subject to considerable commutation sparking, particularly at speeds near synchronism, due to the reactance voltage developed in the coils when their circuits are opened by the brushes.

Since, in repulsion motors there is no difference in potential between the brushes, I have discovered that the sparking, due to the reactance voltage, can be very greatly minimized, by connecting each commutator segment to the adjacent segment through a high resistance, without too greatly reducing the starting torque of the machine or increasing its starting current. My invention also improves the "pull in" conditions in a repulsion induction motor.

Figure 1:
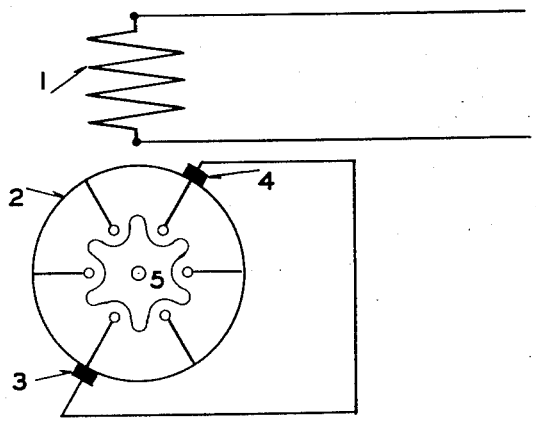
Figure 2:
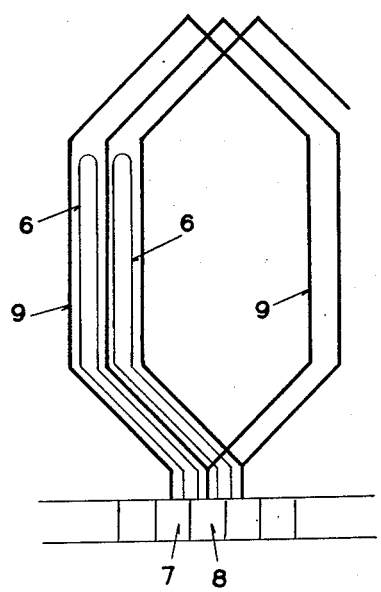
Figure 3:
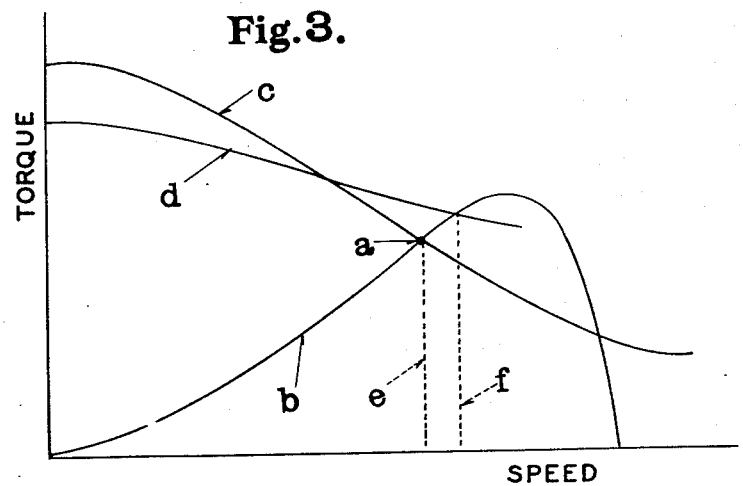

In the accompanying drawing Figure 1 is a diagrammatic illustration of a repulsion motor, also showing diagrammatically a commutator short circuiting mechanism whereby it may be converted into an induction motor in the well known manner; Figure 2 diagrammatically illustrates the manner of embodiment of my invention in such machines; and Figure 3 is a diagram illustrating the improvement in accelerating torque conditions secured by my invention when employed in a repulsion induction motor.

Referring to Figure 1, the stator is provided with a main inducing winding 1 and the rotor with a commuted winding 2, and a commutator with which short circuited brushes 3 and 4 cooperate. 5 diagrammatically indicates mechanism for short circuiting the commuted winding along the plurality of axes, which mechanism may be actuated by a centrifugal device in the well known manner.

Referring to Figure 2 in which a portion of the commuted winding and the commutator is shown in developed form, I provide, in accordance with my invention, loops 6 of high resistance wire, each loop connecting together two adjacent segments of the commutator. For example, the left hand loop shown connects the segments 7 and 8 and thus constitutes a shunt to coil 9 of the commuted winding which joins these segments. The resistance loops or shunts 6 are disposed in the slots of the rotor which carry the turns of the commuted winding but all parts of each loop which are located in a slot are in the same slot and, therefore, since they do not embrace rotor teeth, the currents which they may carry do not affect the working flux of the machine. These high resistance loops maintain a closed circuit for the coils of the commuted winding when their short circuit through a brush is interrupted during commutation, and the reactance voltage cannot rise high enough to produce destructive sparking. Tests have demonstrated that the employment of these resistance shunts very greatly lengthens the life of the brushes.

The provision of the shunts reduces the starting torque and increases the starting current but I have found that if the total resistance of the shunts be sufficiently high that the energy absorbed thereby when the rotor is stationary, the brushes lifted, and the full line voltage impressed on the stator—is not greater than the normal full load output of the machine, the starting current drawn is not more than 30 percent greater than if the shunts were not present and the starting torque is approximately three times the full load torque, which is sufficient for most uses.

In a repulsion motor designed to be converted into an induction motor for normal operation, the presence of the spark suppressing shunts makes it possible to adjust the centrifugal mechanism for operation at a speed nearer synchronism and consequently when the induction motor torque is of higher value, whereby the possibility of the motor not being able to accelerate under load to its synchronous speed, is reduced. The reason for the improvement just described is shown by the curve diagram of Figure 3, where curve "b" shows the straight induction motor torque and curve "c" a straight repulsion motor torque, both in relation to speed. The point "a", where these curves intersect, is the speed at which the short circuiting mechanism will be designed to operate in a machine not provided with my invention. Curve "d" is a portion of the speed torque curve of a machine embodying my invention, the value of the stand-still torque being less than that of the standard repulsion motor, but the point of intersection of this curve with the induction motor torque curve is at a higher value of the latter—the value of the induction motor torque for a standard repulsion motor at the change—over point being shown by the line "$e$" and for my motor by the line "$f$."

Having fully described my invention, what I claim as new and desire to secure by Letters Patent of the United States is:

1. In a single phase motor, the combination of an inducing member, a slotted induced member provided with a commuted winding in said slots and with a commutator, short circuited brushes cooperating with the commutator, and loops of high resistance conductive material connecting adjacent commutator segments and positioned in the slots of the induced member each loop being confined to a single slot.

2. In a single phase motor comprising an inducing member and a slotted induced member having a single induced winding, said winding being provided with a commutator and brushes short-circuiting said winding along a fixed axis during starting, means for partially reducing commutation sparking comprising loops of high resistance material connecting each commutator segment to segments adjacent to it, said loops being positioned in the slots of the induced member each loop being confined to a single slot and the total resistance of said loops being such that the energy consumed thereby, when normal line voltage is impressed upon the inducing winding and the brushes are out of contact with the commutator, is not greater than the full load out-put of the motor.

In testimony whereof, I hereunto affix my signature, this 4th day of November, 1930.

HANS WEICHSEL.